(12) United States Patent
Jeong et al.

(10) Patent No.: US 12,656,763 B2
(45) Date of Patent: Jun. 16, 2026

(54) METHOD AND APPARATUS FOR DETERMINING FACTORY ENERGY MANAGEMENT SYSTEM NETWORK CONFIGURATION SUITABILITY

(71) Applicant: ELECTRONICS AND TELECOMMUNICATIONS RESEARCH INSTITUTE, Daejeon (KR)

(72) Inventors: Jin Doo Jeong, Sejong-si (KR); Il Woo Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 351 days.

(21) Appl. No.: 18/228,157

(22) Filed: Jul. 31, 2023

(65) Prior Publication Data

US 2024/0134355 A1    Apr. 25, 2024
US 2024/0231332 A9    Jul. 11, 2024

(30) Foreign Application Priority Data

Oct. 24, 2022    (KR) ........................ 10-2022-0137213
Apr. 24, 2023    (KR) ........................ 10-2023-0053530

(51) Int. Cl.
*G05B 19/418*      (2006.01)

(52) U.S. Cl.
CPC .................... *G05B 19/4185* (2013.01); *G05B 2219/23102* (2013.01)

(58) Field of Classification Search
CPC ...... G05B 19/4185; G05B 2219/23102; G06Q 10/063; G06Q 50/06
See application file for complete search history.

(56) References Cited

U.S. PATENT DOCUMENTS 10,049,373 B2 *   8/2018   Takahashi .............. G06Q 50/06
2013/0226353 A1    8/2013   Park
(Continued)

FOREIGN PATENT DOCUMENTS

KR    10-2016-0053129 A    5/2016
KR       10-2002995 B1    7/2019
(Continued)

OTHER PUBLICATIONS

Jin-Doo Jeong et al., "A Derivation Method of Communication Applicability Matrix for Appropriate FEMS Networking", Energy & Environment ICT Research Department, ETRI, 2021.
(Continued)

*Primary Examiner* — William P Bartlett
(74) *Attorney, Agent, or Firm* — LRK PATENT LAW FIRM

(57) ABSTRACT

A method and apparatus for determining the suitability of a network configuration for a factory energy management system (FEMS) are provided. The method includes receiving an energy management level for obtaining the suitability of a network configuration for an FEMS, receiving second parameters according to the energy management level among first parameters set for the network configuration, receiving a communication characteristics matrix and a communication adaptability matrix for communication schemes usable for the network configuration, obtaining a communication characteristics metric matrix by normalizing the communication characteristics matrix, based on the second parameters and the communication characteristics matrix, obtaining a communication adaptability metric matrix by normalizing the communication adaptability matrix, based on the energy management level, the second parameters, and the communication adaptability matrix, and determining the suitability of the network configuration at
(Continued)

the energy management level based on the communication characteristics metric matrix and the communication adaptability metric matrix.

20 Claims, 7 Drawing Sheets

(56) References Cited

U.S. PATENT DOCUMENTS

| | | |
|---|---|---|
| 2015/0234408 A1 | 8/2015 | Lee et al. |
| 2019/0156438 A1* | 5/2019 | Song ...................... G06Q 50/06 |
| 2020/0175355 A1* | 6/2020 | Chung ................ G06F 15/8046 |
| 2024/0340787 A1* | 10/2024 | Sampathkumar ........................... |
| | | H04W 52/0206 |

FOREIGN PATENT DOCUMENTS

| | | |
|---|---|---|
| KR | 10-2020-0053379 A | 5/2020 |
| KR | 10-2020-0089262 A | 7/2020 |
| KR | 10-2022-0139557 A | 10/2022 |

OTHER PUBLICATIONS

Richard Candell et al., "Guide to Industrial Wireless Systems Deployments", NIST Advanced Manufacturing Series 300-4, NIST, Apr. 2018.

* cited by examiner

_200

| | Selected FEMS Network Configuration Parameters | | | |
|---|---|---|---|---|
| | Low CAPEX | Low OPEX | Low Cost | High Reliability |
| Optical Network | 2/(8*4) | 2/(8*4) | 2/(8*4) | 8/(8*4) |
| LTE | 4/(8*4) | 2/(8*4) | 2/(8*4) | 8/(8*4) |
| Wi-Fi | 6/(8*4) | 8/(8*4) | 6/(8*4) | 4/(8*4) |
| LoRa | 8/(8*4) | 8/(8*4) | 8/(8*4) | 2/(8*4) |

|  |  | Utility 2 |
|---|---|---|
| Optical Network | Low CAPEX | 24/(96*4) |
|  | Low OPEX | 24/(96*4) |
|  | Low Cost | 16/(96*4) |
|  | High Reliability | 64/(96*4) |
| LTE | Low CAPEX | 48/(96*4) |
|  | Low OPEX | 24/(96*4) |
|  | Low Cost | 16/(96*4) |
|  | High Reliability | 64/(96*4) |
| Wi-Fi | Low CAPEX | 72/(96*4) |
|  | Low OPEX | 96/(96*4) |
|  | Low Cost | 48/(96*4) |
|  | High Reliability | 32/(96*4) |
| LoRa | Low CAPEX | 96/(96*4) |
|  | Low OPEX | 96/(96*4) |
|  | Low Cost | 64/(96*4) |
|  | High Reliability | 16/(96*4) |

FIG. 3

| Symbol | Description |
|---|---|
| $E_A$ | FEMS energy management level for level A |
| $C_A$ | FEMS network communication scheme for communication scheme A |
| $P_A$ | FEMS network configuration parameter for configuration parameter A |
| $M(C_A|E_B)$ 410 | FEMS suitability metric of communication scheme A for energy management level B |
| $M(C_A)$ 430 | FEMS suitability metric for communication scheme A |
| $M(E_A|C_B)$ 450 | FEMS suitability metric of energy management level A for communication scheme B |
| $M(C_A|P_B)$ 470 | FEMS suitability metric of communication scheme A for configuration parameter A |
| $M(E_A|C_B,P_C)$ 490 | FEMS suitability metric of energy management level A for communication scheme B and configuration parameter C |

FIG. 4

METHOD AND APPARATUS FOR DETERMINING FACTORY ENERGY MANAGEMENT SYSTEM NETWORK CONFIGURATION SUITABILITY

CROSS-REFERENCE TO RELATED APPLICATIONS

This application claims the benefit of Korean Patent Application No. 10-2022-0137213, filed on Oct. 24, 2022, and Korean Patent Application No. 10-2023-0053530, filed on Apr. 24, 2023, in the Korean Intellectual Property Office, the entire disclosures of which are incorporated herein by reference for all purposes.

BACKGROUND

1. Field of the Invention

One or more embodiments relate to a method and apparatus for determining factory energy management system (FEMS) network configuration suitability.

2. Description of Related Art

Reduction of energy and power consumption in the industrial sector greatly contributes to national energy conservation. To this end, energy efficiency should be achieved through energy management in the industrial sector, and a system needed for this is a factory energy management system, that is, FEMS.

An FEMS for energy efficiency in the industrial sector should be established based on monitoring of energy consumption of energy resources in factories. In general, wired communication has been mainly used thus far for monitoring and controlling resources/devices in industrial sectors, particularly in factories where there are many non-communication factors such as metal, dust, and vibration. However, with the advent of the 4th Industrial Revolution, wireless communication technologies such as 5G are evolving to be used to establish factory networking for networking establishment cost reduction and process flexibility. This indicates that among the evolving industrial wireless communication technologies, a wireless communication technology suitable for FEMS networking to be established may be selected and applied in consideration of networking establishment factors such as functions and costs.

SUMMARY

To objectively determine which communication scheme is suitable for each energy management level of a factory energy management system (FEMS), a technique for determining the suitability of an FEMS network configuration is demanded.

An embodiment may provide a technique for determining the suitability of an FEMS network configuration at an energy management level based on a communication characteristics matrix and a communication adaptability matrix.

An embodiment may provide a technique for determining the suitability of an FEMS network configuration by calculating an energy management level conditional communication metric based on conditional probability theory.

However, the technical goals are not limited to those described above, and other technical goals may be present.

According to an aspect, there is provided a method of determining a suitability of a network configuration for a factory energy management system (FEMS), the method including receiving an energy management level for obtaining the suitability of the network configuration, receiving second parameters according to the energy management level among first parameters set for the network configuration, receiving a communication characteristics matrix and a communication adaptability matrix for communication schemes usable for the network configuration, obtaining a communication characteristics metric matrix by normalizing the communication characteristics matrix, based on the second parameters and the communication characteristics matrix, obtaining a communication adaptability metric matrix by normalizing the communication adaptability matrix, based on the energy management level, the second parameters, and the communication adaptability matrix, and determining the suitability of the network configuration at the energy management level based on the communication characteristics metric matrix and the communication adaptability metric matrix. The communication characteristics matrix may include characteristic values indicating characteristics of the communication schemes for the first parameters, and the communication adaptability matrix may include characteristic values indicating characteristics of the communication schemes for the first parameters, considering a weight according to the energy management level.

The first parameters may include one or more of a low operating expense (OPEX) characteristic, a low capital expenditure (CAPEX) characteristic, a flexibility, a high data rate characteristic, a high reliability characteristic, a low latency characteristic, a low power characteristic, and a low cost characteristic of the network.

The obtaining of the communication characteristics metric matrix may include extracting characteristic values for the second parameters from the communication characteristics matrix, and normalizing the characteristic values for the second parameters to a value obtained by multiplying a number of second parameters by a maximum value for constituting the communication characteristics matrix.

The obtaining of the communication adaptability metric matrix may include extracting characteristic values for the second parameters according to the energy management level from the communication adaptability matrix, and normalizing the characteristic values for the second parameters according to the energy management level to a value obtained by multiplying a number of second parameters by a maximum value for constituting the communication adaptability matrix.

The determining of the suitability of the network configuration may include calculating first suitability metrics for the communication schemes using a conditional probability based on the communication characteristics metric matrix and the communication adaptability metric matrix, and selecting a most suitable communication scheme at the energy management level in the network configuration based on the first suitability metrics. The first suitability metrics may indicate how suitable a predetermined communication scheme for the energy management level is for the network configuration as numerical indices.

The calculating of the first suitability metrics may include calculating second suitability metrics for the communication schemes based on the communication characteristics metric matrix, and calculating third suitability metrics for the communication schemes based on the communication adaptability metric matrix. The second suitability metrics may indicate how suitable a predetermined communication scheme is for the network configuration as numerical indices, and the third suitability metrics may indicate how suitable the energy management level for a predetermined communication scheme is for the network configuration as numerical indices.

The calculating of the first suitability metrics may further include calculating the first suitability metrics based on the second suitability metrics and the third suitability metrics.

The calculating of the second suitability metrics may include extracting fourth suitability metrics based on the communication characteristics metric matrix, and calculating the second suitability metrics based on the fourth suitability metrics. The fourth suitability metrics may indicate how suitable a communication scheme for the second parameters is for the network configuration as numerical indices.

The calculating of the third suitability metrics may include extracting fifth suitability metrics based on the communication adaptability metric matrix, and calculating the third suitability metrics based on the fifth suitability metrics. The fifth suitability metrics may indicate how suitable the energy management level for a predetermined communication scheme and the second parameters is for the network configuration as numerical indices.

The selecting of the communication scheme may include comparing the first suitability metrics for the communication schemes usable for the network configuration, and selecting a communication scheme having a largest first metric as the most suitable communication scheme for the network configuration.

According to an aspect, there is provided an apparatus for determining a suitability of a network configuration for an FEMS, the apparatus including a memory configured to store one or more instructions, and a processor configured to execute the instructions, wherein when the instructions are executed, the processor may be configured to perform a plurality of operations, wherein the plurality of operations may include receiving an energy management level for obtaining the suitability of the network configuration, receiving second parameters according to the energy management level among first parameters set for the network configuration, receiving a communication characteristics matrix and a communication adaptability matrix for communication schemes usable for the network configuration, obtaining a communication characteristics metric matrix by normalizing the communication characteristics matrix, based on the second parameters and the communication characteristics matrix, obtaining a communication adaptability metric matrix by normalizing the communication adaptability matrix, based on the energy management level, the second parameters, and the communication adaptability matrix, and determining the suitability of the network configuration at the energy management level based on the communication characteristics metric matrix and the communication adaptability metric matrix. The communication characteristics matrix may include characteristic values indicating characteristics of the communication schemes for the first parameters, and the communication adaptability matrix may include characteristic values indicating characteristics of the communication schemes for the first parameters, considering a weight according to the energy management level.

The first parameters may include one or more of a low OPEX characteristic, a low CAPEX characteristic, a flexibility, a high data rate characteristic, a high reliability characteristic, a low latency characteristic, a low power characteristic, and a low cost characteristic of the network.

The obtaining of the communication characteristics metric matrix may include extracting characteristic values for the second parameters from the communication characteristics matrix, and normalizing the characteristic values for the second parameters to a value obtained by multiplying a number of second parameters by a maximum value for constituting the communication characteristics matrix.

The obtaining of the communication adaptability metric matrix may include extracting characteristic values for the energy management level and the second parameters from the communication adaptability matrix, and normalizing the extracted characteristic values to a value obtained by multiplying a number of second parameters by a maximum value for constituting the communication adaptability matrix.

The determining of the suitability of the network configuration may include calculating first suitability metrics for the communication schemes using a conditional probability based on the communication characteristics metric matrix and the communication adaptability metric matrix, and selecting a most suitable communication scheme at the energy management level in the network configuration based on the first suitability metrics. The first suitability metrics may indicate how suitable a predetermined communication scheme for the energy management level is for the network configuration as numerical indices.

The calculating of the first suitability metrics may include calculating second suitability metrics for the communication schemes based on the communication characteristics metric matrix, and calculating third suitability metrics for the communication schemes based on the communication adaptability metric matrix. The second suitability metrics may indicate how suitable a predetermined communication scheme is for the network configuration as numerical indices, and the third suitability metrics may indicate how suitable the energy management level for a predetermined communication scheme is for the network configuration as numerical indices.

The calculating of the first suitability metrics may further include calculating the first suitability metrics based on the second suitability metrics and the third suitability metrics.

The calculating of the second suitability metrics may include extracting fourth suitability metrics based on the communication characteristics metric matrix, and calculating the second suitability metrics based on the fourth suitability metrics. The fourth suitability metrics may indicate how suitable a communication scheme for the second parameters is for the network configuration as numerical indices.

The calculating of the third suitability metrics may include extracting fifth suitability metrics based on the communication adaptability metric matrix, and calculating the third suitability metrics based on the fifth suitability metrics. The fifth suitability metrics may indicate how suitable the energy management level for a predetermined communication scheme and the second parameters is for the network configuration as numerical indices.

The selecting of the communication scheme may include comparing the first suitability metrics for the communication schemes usable for the network configuration, and selecting a communication scheme having a largest first metric as the most suitable communication scheme for the network configuration.

Additional aspects of embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 2 illustrates an example of a communication characteristics metric matrix according to an embodiment;

FIG. 3 illustrates an example of a communication adaptability metric matrix according to an embodiment;

FIG. 4 is a table illustrating symbols to be applied to a metric calculation method according to an embodiment;

DETAILED DESCRIPTION

Figure 1:
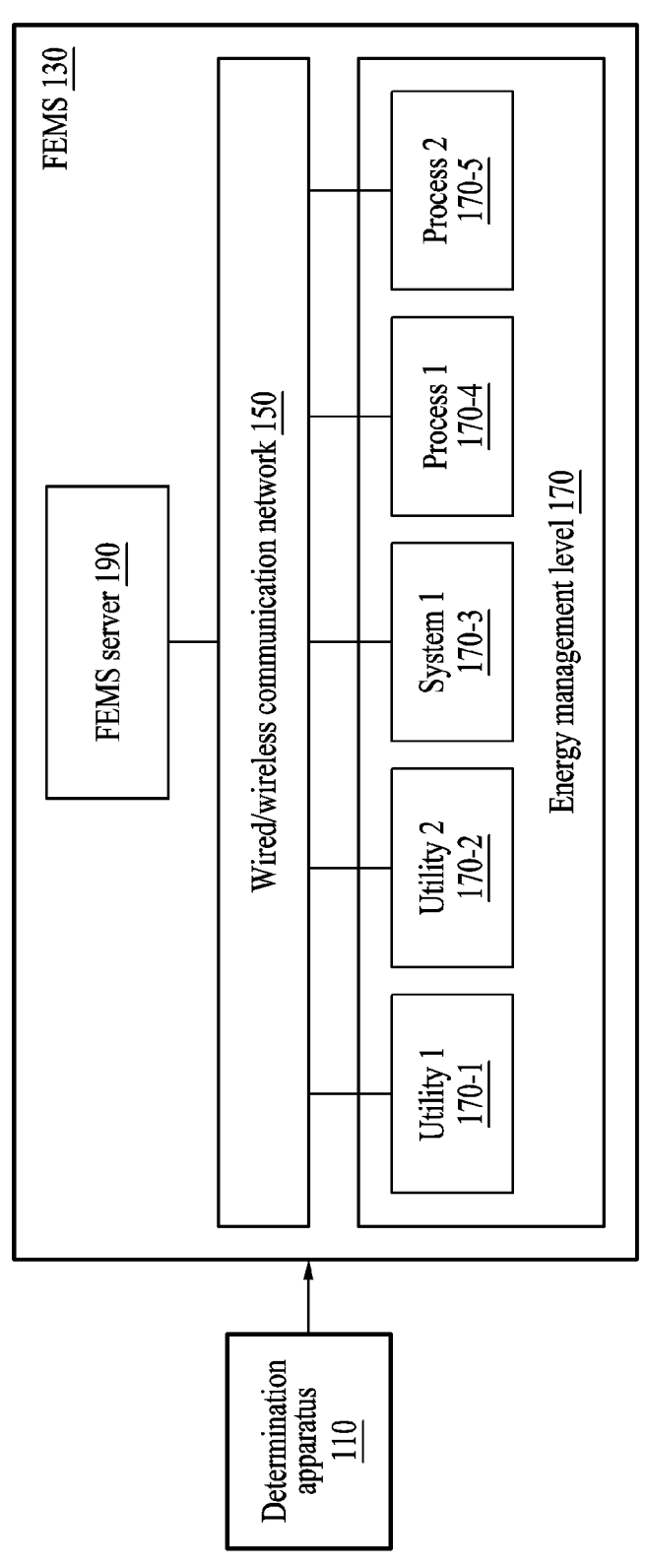
FIG. 1 illustrates a factory energy management system (FEMS) and a determination apparatus according to an embodiment.

The following detailed structural or functional description is provided as an example only and various alterations and modifications may be made to the embodiments. Here, the embodiments are not construed as limited to the disclosure and should be understood to include all changes, equivalents, and replacements within the idea and the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly, the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or populations thereof.

Unless otherwise defined, all terms, including technical and scientific terms, used herein have the same meaning as commonly understood by those having ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, embodiments will be described in detail with reference to the accompanying drawings. When describing the embodiments with reference to the accompanying drawings, like reference numerals refer to like elements and a repeated description related thereto will be omitted.

FIG. 1 illustrates a factory energy management system (FEMS) and a determination apparatus according to an embodiment.

Referring to FIG. 1, a determination apparatus 110 (e.g., an apparatus for determining the suitability of an FEMS network configuration) may determine the suitability of a wired/wireless communication network 150 for each energy management level 170 in an FEMS 130. The FEMS 130 may include the network 150 (e.g., the wired/wireless communication network), the energy management levels 170, and an FEMS server 190. The network 150 may include optical network communication, long-term evolution (LTE) communication, Wireless Fidelity (Wi-Fi) communication, and long range (LoRa) communication. The energy management levels 170 may include Utility 1 170-1, Utility 2 170-2, System 1 170-3, Process 1 170-4, and Process 2 170-5.

The determination apparatus 110 may receive an energy management level 170 for obtaining the suitability of the configuration of the network 150 of the FEMS 130. The determination apparatus 110 may receive second parameters according to the energy management level 170 among first parameters set for the configuration of the network 150 of the FEMS 130. The determination apparatus 110 may receive a communication characteristics matrix and a communication adaptability matrix for communication schemes usable for the configuration of the network 150 of the FEMS 130. The determination apparatus 110 may obtain a communication characteristics metric matrix by normalizing the communication characteristics matrix, based on the second parameters and the communication characteristics matrix. The determination apparatus 110 may obtain a communication adaptability metric matrix by normalizing the communication adaptability matrix, based on the energy management level, the second parameters, and the communication adaptability matrix. The determination apparatus 110 may determine the suitability of the configuration of the network 150 at the energy management level based on the communication characteristics metric matrix and the communication adaptability metric matrix.

The first parameters may be set for the configuration of the network 150 of the FEMS 130. The first parameters may be determined based on an analysis of a process to be managed by the FEMS 130. The first parameters may be determined based on an actual inspection of a factory to which the FEMS 130 is to be introduced or an analysis of factory design and factory facility information.

The first parameters may be factors that affect the network 150 to be applied to the FEMS 130. The first parameters may be determined by analyzing the factors affecting the network 150 in various aspects, such as the functions, economic feasibility, and process flexibility of the network 150.

For example, high data rate, high reliability, and low latency characteristics may be set as the first parameters in terms of communication quality. Low capital expenditure (CAPEX) and low operating expense (OPEX) characteristics may be set as the first parameters in terms of establishing and operating costs. Low cost and low power characteristics may be set as the first parameters in terms of terminals. Network flexibility characteristics may be set as the first parameters in terms of process reconstruction. However, the setting of the first parameters is not limited thereto, and various first parameters may be set according to the purpose of configuring the network 150, the working environment of each factory, the communication channel environment, the process flow, and the energy resources to be used.

The first parameters may different significances according to the energy management level 170 in the configuration of the network 150. The second parameters may be selected according to the association with the energy management level from among the first parameters based on the significances according to the energy management level 170.

For example, the determination apparatus 110 may receive Utility 2 170-2 as an energy management level to determine the suitability of the configuration of the network 150 to be applied to the FEMS 130. Since Utility 2 170-2 focuses on energy monitoring, network installation and maintenance costs may be considered as important. The determination apparatus 110 may receive, as the second parameters, "Low CAPEX", "Low OPEX", "Low Cost", and "High Reliability" determined to be highly associated with Utility 2 170-2 among the first parameters.

The communication schemes usable for the configuration of the network 150 may include optical network communication widely used in industries and factories, LTE communication that provides stable communication quality, Wi-Fi communication highly utilized as built in smart devices as a wireless communication scheme, and LoRa communication having low-power long-distance communication characteristics. However, embodiments are not limited thereto, and the communication schemes may include all types of communication technologies that are applicable to factories.

The communication characteristics matrix may include characteristic values indicating characteristics of the communication schemes usable for the configuration of the network 150 for the first parameters.

For example, when the first parameters are set as shown in Table 1 and the usable communication schemes include optical network communication, LTE, Wi-Fi, and LoRa, the communication characteristics matrix may be determined as shown in Table 1.

TABLE 1

| | First Parameters | | | | | | | |
|---|---|---|---|---|---|---|---|---|
| | Low CAPEX | Low OPEX | Low Cost | Low Power | High Reliability | Low Latency | High Data Rate | Flexibility |
| Optical network | 2 | 2 | 2 | 8 | 8 | 8 | 8 | 2 |
| LTE | 4 | 2 | 2 | 4 | 8 | 6 | 8 | 6 |
| Wi-Fi | 6 | 8 | 6 | 2 | 4 | 6 | 6 | 6 |
| LoRa | 8 | 8 | 8 | 8 | 2 | 2 | 2 | 8 |

As shown in Table 1, the communication characteristics matrix may include communication schemes usable for the configuration of the network and the first parameters. In Table 1, characteristic values of communication schemes respectively corresponding to the first parameters may be written as numerical values.

The communication adaptability matrix may include characteristic values indicating characteristics of the communication schemes usable for the configuration of the network 150 for the first parameters, considering a weight according to the energy management level.

For example, when the first parameters are set as shown in Table 1 and the usable communication schemes include optical network communication, LTE, Wi-Fi, and LoRa, the communication adaptability matrix may be derived by multiplying the characteristic value of each communication scheme included in the communication characteristics matrix for the first parameters by parameter weights corresponding to the first parameters for each energy management level. The derived communication adaptability matrix may be shown in Table 2.

TABLE 2

| | | Utility 1 | Utility 2 | System 1 | Process 1 | Process 2 |
|---|---|---|---|---|---|---|
| Optical Network | Low CAPEX | 24 | 24 | 16 | 16 | 16 |
| | Low OPEX | 24 | 24 | 16 | 16 | 16 |
| | Low Cost | 24 | 16 | 16 | 16 | 16 |
| | Low Power | 96 | 64 | 64 | 64 | 32 |
| | High Reliability | 32 | 64 | 64 | 96 | 96 |
| | Low Latency | 32 | 64 | 64 | 96 | 96 |
| | High Data Rate | 32 | 32 | 64 | 96 | 64 |
| | Flexibility | 16 | 16 | 16 | 24 | 16 |
| LTE | Low CAPEX | 48 | 48 | 32 | 32 | 32 |
| | Low OPEX | 24 | 24 | 16 | 16 | 16 |
| | Low Cost | 24 | 16 | 16 | 16 | 16 |
| | Low Power | 48 | 32 | 32 | 32 | 16 |
| | High Reliability | 32 | 64 | 64 | 96 | 96 |
| | Low Latency | 24 | 48 | 48 | 72 | 72 |
| | High Data Rate | 32 | 32 | 64 | 96 | 64 |
| | Flexibility | 48 | 48 | 48 | 72 | 48 |
| Wi-Fi | Low CAPEX | 72 | 72 | 48 | 48 | 48 |
| | Low OPEX | 96 | 96 | 64 | 64 | 64 |
| | Low Cost | 72 | 48 | 48 | 48 | 48 |
| | Low Power | 24 | 16 | 16 | 16 | 8 |
| | High Reliability | 16 | 32 | 32 | 48 | 48 |
| | Low Latency | 24 | 48 | 48 | 72 | 72 |
| | High Data Rate | 24 | 24 | 48 | 72 | 48 |
| | Flexibility | 48 | 48 | 48 | 72 | 48 |
| LoRa | Low CAPEX | 96 | 96 | 64 | 64 | 64 |
| | Low OPEX | 96 | 96 | 64 | 64 | 64 |
| | Low Cost | 96 | 64 | 64 | 64 | 64 |
| | Low Power | 96 | 64 | 64 | 64 | 32 |
| | High Reliability | 8 | 16 | 16 | 24 | 24 |
| | Low Latency | 8 | 16 | 16 | 24 | 24 |
| | High Data Rate | 8 | 8 | 16 | 24 | 16 |
| | Flexibility | 64 | 64 | 64 | 96 | 64 |

As shown in Table 2, the communication adaptability matrix may include the communication schemes usable for the configuration of the network, the first parameters, and the energy management levels 170.

FIG. 2 illustrates an example of a communication characteristics metric matrix according to an embodiment.

Referring to FIG. 2, the determination apparatus 110 may obtain a communication characteristics metric matrix 200 by normalizing a communication characteristics matrix, based on second parameters and the communication characteristics matrix. The determination apparatus 110 may extract characteristic values for the second parameters from the communication characteristics matrix. The determination apparatus 110 may normalize the characteristic values for the second parameters to a value obtained by multiplying the number of second parameters by the maximum value for constituting the communication characteristics matrix.

For example, the determination apparatus 110 may extract characteristic values (e.g., Table 3) for the second parameters (e.g., including one or more of the low CAPEX, the low OPEX, the low cost, and the high reliability) from the communication characteristics matrix of Table 1. The determination apparatus 110 may normalize the characteristic values for the second parameters to a value obtained by multiplying the number of second parameters (e.g., "4") by the maximum value (e.g., "8") for constituting the communication characteristics matrix. The determination apparatus 110 may obtain the communication characteristics metric matrix 200.

TABLE 3

| | Second Parameters | | | |
|---|---|---|---|---|
| | Low CAPEX | Low OPEX | Low Cost | High Reliability |
| Optical network | 2 | 2 | 2 | 8 |
| LTE | 4 | 2 | 2 | 8 |
| Wi-Fi | 6 | 8 | 6 | 4 |
| LoRa | 8 | 8 | 8 | 2 |

FIG. 3 illustrates an example of a communication adaptability metric matrix according to an embodiment.

Referring to FIG. 3, the determination apparatus 110 may obtain a communication adaptability metric matrix 300 by normalizing a communication adaptability matrix, based on an energy management level 170, second parameters, and the communication characteristics matrix. The determination apparatus 110 may extract characteristic values for the second parameters according to the energy management level from the communication adaptability matrix. The determination apparatus 110 may normalize the characteristic values for the second parameters to a value obtained by multiplying the number of second parameters by the maximum value for constituting the communication adaptability matrix.

For example, the determination apparatus 110 may extract characteristic values (e.g., Table 4) for the second parameters (e.g., the low CAPEX, the low OPEX, the low cost, and the high reliability) according to an energy management level (e.g., Utility 2) from the communication adaptability matrix of Table 2. The determination apparatus 110 may normalize the characteristic values for the second parameters according to the energy management level to a value obtained by multiplying the number of second parameters (e.g., "4") by the maximum value (e.g., "96") for constituting the communication adaptability matrix. The determination apparatus 110 may obtain the communication adaptability metric matrix 300.

TABLE 4

| | | Utility 2 |
|---|---|---|
| Optical Network | Low CAPEX | 24/(96*4) |
| | Low OPEX | 24/(96*4) |
| | Low Cost | 16/(96*4) |
| | High Reliability | 64/(96*4) |
| LTE | Low CAPEX | 48/(96*4) |
| | Low OPEX | 24/(96*4) |
| | Low Cost | 16/(96*4) |
| | High Reliability | 64/(96*4) |
| Wi-Fi | Low CAPEX | 72/(96*4) |
| | Low OPEX | 96/(96*4) |
| | Low Cost | 48/(96*4) |
| | High Reliability | 32/(96*4) |
| LoRa | Low CAPEX | 96/(96*4) |
| | Low OPEX | 96/(96*4) |
| | Low Cost | 64/(96*4) |
| | High Reliability | 16/(96*4) |

FIG. 4 is a table illustrating symbols to be applied to a metric calculation method according to an embodiment.

Referring to FIG. 4, $M(C_A|E_B)$ 410 may denote an FEMS suitability metric of a communication scheme A for an energy management level B. $M(C_A)$ 430 may denote an FEMS suitability metric for the communication scheme A. $M(E_A|C_B)$ 450 may denote an FEMS suitability metric of an energy management level A for a communication scheme B. $M(C_A|P_B)$ 470 may denote an FEMS suitability metric of the communication scheme A for a configuration parameter B. $M(E_A|C_B,P_C)$ 490 may denote an FEMS suitability metric of the energy management level A for the communication scheme B and a configuration parameter C.

A first suitability metric indicates how suitable a predetermined communication scheme for an energy management level is for the configuration of the network 150 as numerical indices. That is, the first suitability metric may be $M(C_A|E_B)$ 410.

A second suitability metric indicates how suitable a predetermined communication scheme is for the configuration of the network 150 as numerical indices. That is, the second suitability metric may be $M(C_A)$ 430.

A third suitability metric indicates how suitable an energy management level for a predetermined communication scheme is for the configuration of the network 150 as numerical indices. That is, the third suitability metric may be $M(E_A|C_B)$ 450.

A fourth suitability metric indicates how suitable a communication scheme for second parameters is for the configuration of the network 150 as numerical indices. The fourth suitability metric may be $M(C_A|P_B)$ 470.

A fifth suitability metric indicates how suitable an energy management level for a predetermined communication scheme and the second parameters is for the configuration of the network 150 as numerical indices. That is, the fifth suitability metric may be $M(E_A|C_B,P_C)$ 490.

Figure 5:
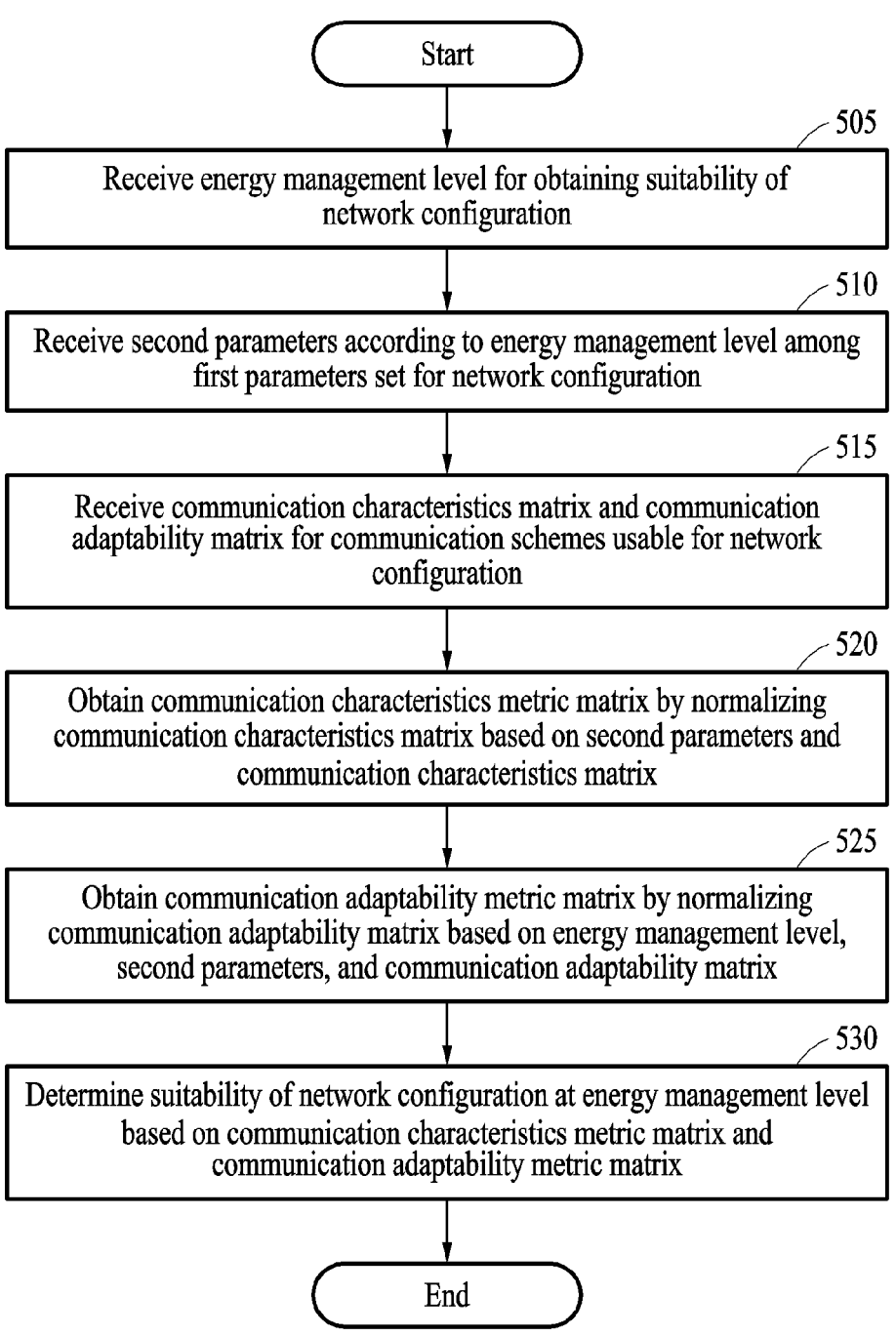
FIG. 5 is a flowchart illustrating an example of a determination method according to an embodiment.

FIG. 5 is a flowchart illustrating an example of a determination method according to an embodiment.

Referring to FIG. 5, in operation 505, the determination apparatus 110 may receive an energy management level 170 for obtaining the suitability of a configuration of a network 150.

In operation 510, the determination apparatus 110 may receive second parameters according to the energy management level among first parameters set for the configuration of the network 150.

In operation 515, the determination apparatus 110 may receive a communication characteristics matrix and a communication adaptability matrix for communication schemes usable for the configuration of the network 150.

In operation 520, the determination apparatus 110 may obtain a communication characteristics metric matrix (e.g., the communication characteristics metric matrix 200 of FIG. 2) by normalizing the communication characteristics matrix, based on the second parameters and the communication characteristics matrix.

In operation 525, the determination apparatus 110 may obtain a communication adaptability metric matrix 300 (e.g., the communication adaptability metric matrix of FIG. 3) by normalizing the communication adaptability matrix, based on the energy management level, the second parameters, and the communication characteristics matrix.

In operation 530, the determination apparatus 110 may determine the suitability of the network configuration at the energy management level based on the communication characteristics metric matrix 200 and the communication adaptability metric matrix 300.

The determination apparatus 110 may calculate first suitability metrics (e.g., $M(C_A|E_B)$ 410 of FIG. 4) for the communication schemes using a conditional probability based on the communication characteristics metric matrix 200 and the communication adaptability metric matrix 300.

Before considering the conditional probability to be utilized in the present disclosure, the law of total probability related to the conditional probability may be considered herein. In probability theory, the theory of total probability is a rule for calculating a probability by dividing a sample space into non-overlapping events, wherein the sample space may be expressed with respect to N events that are non-overlapping, as in Equation 1 below.

$$P(A) = \sum_{j=1}^{N} P(A|B_j) = P(A|B_1) + P(A|B_2) + \dots + P(A|B_N) \quad \text{[Equation 1]}$$

In probability theory, conditional probability refers to the probability of an event occurring under the condition that another event has already occurred, and may be expressed by Equation 2 below according to Bayes' theorem.

$$P(A_i|B) = \frac{P(B|A_i)P(A_i)}{P(B)} \quad \text{[Equation 2]}$$

If Equation 1 representing the law of total probability is applied to Equation 2 representing the conditional probability, Equation 2 may be extended to Equation 3 as below.

$$P(A_i|B) = \frac{P(B|A_i)P(A_i)}{P(B)} = \frac{P(B|A_i)P(A_i)}{\sum_{j=1}^{N} P(B|A_j)} =$$

$$\frac{P(B|A_i)P(A_i)}{P(B|A_1) + P(B|A_2) + \dots + P(B|A_N)} \quad \text{[Equation 3]}$$

Hereinafter, a method of calculating first suitability metrics for communication schemes based on Equations 1, 2, and 3 and determining the suitability of a network configuration at an energy management level will be described in detail.

Figure 6:
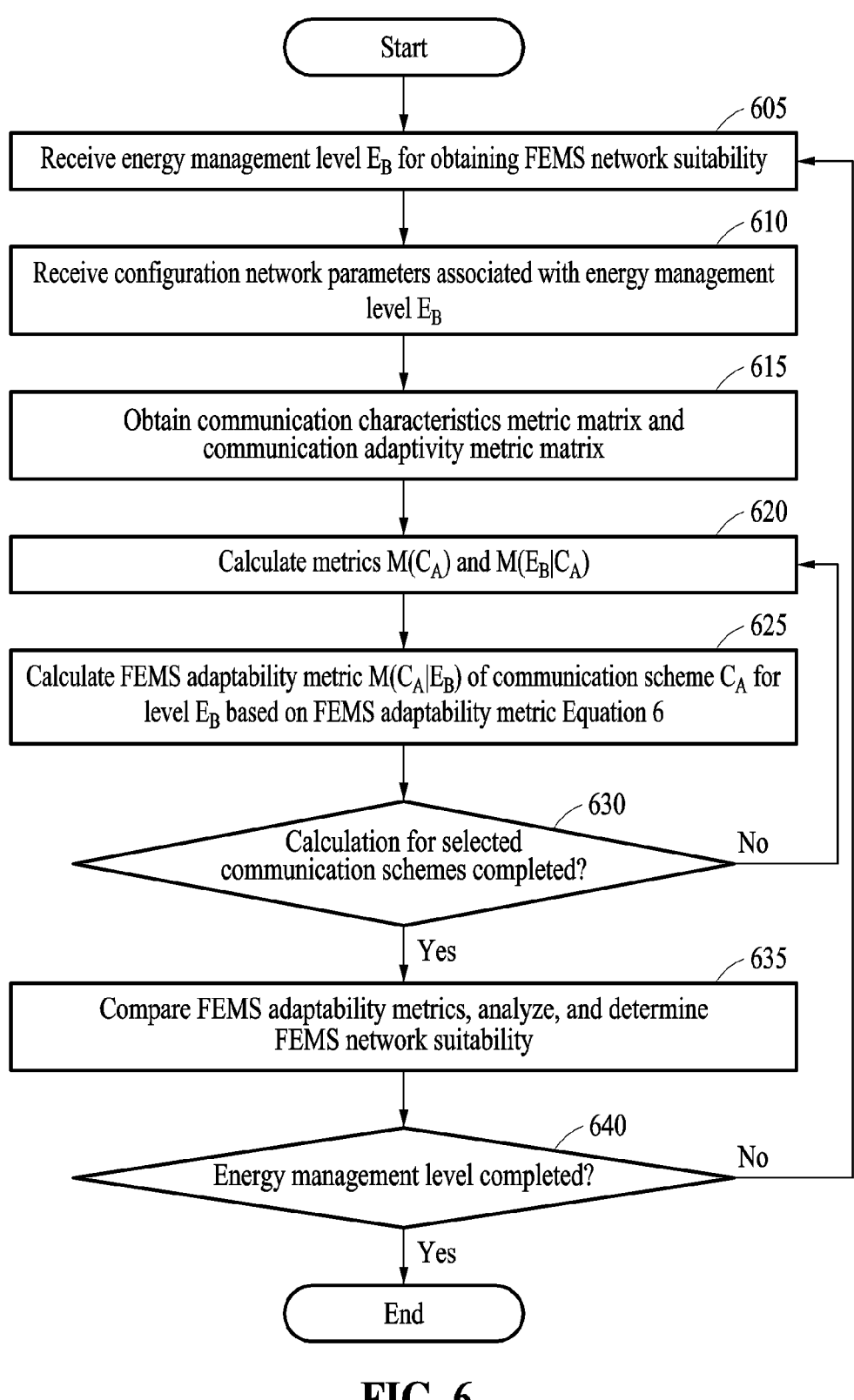
FIG. 6 is a flowchart illustrating the determination method of FIG. 5.

FIG. 6 is a flowchart illustrating the determination method of FIG. 5.

Referring to FIG. 6, in operation 605, the determination apparatus 110 may receive an energy management level 170 for obtaining the suitability of a configuration of a network 150. For example, the determination apparatus 110 may receive Utility 2 170-2 as an energy management level.

In operation 610, the determination apparatus 110 may receive second parameters related to the energy management level. For example, the determination apparatus 110 may receive second parameters (e.g., a low CAPEX, a low OPEX, a low cost, and a high reliability) associated with Utility 2 170-2.

In operation 615, the determination apparatus 110 may obtain a communication characteristics metric matrix and a communication adaptability metric matrix.

For example, the determination apparatus 110 may obtain a communication characteristics metric matrix 200 by normalizing the communication characteristics matrix based on the communication characteristics matrix (e.g., Table 1) and the second parameters.

For example, the determination apparatus 110 may obtain a communication adaptability metric matrix 300 based on Utility 2 170-2, the second parameters, and the communication adaptability matrix (e.g., Table 2).

In operation 620, the determination apparatus 110 may calculate second suitability metrics (e.g., $M(C_A)$ 430 of FIG. 4) and third suitability metrics (e.g., $M(E_B|C_A)$ 450 of FIG. 4). In calculating the second suitability metrics 430 and the third suitability metrics 450, the following equation may be used.

Applying the form of the law of total probability expressed by Equation 1, the metrics $M(C_A)$ 430 and $M(E_B|C_A)$ 450 may be expressed by the following equations.

$$M(C_A) = \quad \text{[Equation 4]}$$
$$\sum_{j=1}^{S} M(C_A|P_j) = M(C_A|P_1) + M(C_A|P_2) + \dots + M(C_A|P_S)$$

$$M(E_B|C_A) = \sum_{j=1}^{S} M(E_B|C_A, P_j) = \quad \text{[Equation 5]}$$
$$M(E_B|C_A, P_1) + M(E_B|C_A, P_2) + \dots + M(E_B|C_A, P_S)$$

In Equations 4 and 5, S denotes the number of second parameters according to an energy management level $E_B$.

It may be learned from Equations 1 and 4 that a metric $M(C_A)$ 430 for a communication scheme is the sum of metrics $M(C_A|P_j)$ 470 for the second parameters.

From Equations 1 and 5, a metric $M(E_B|C_A)$ 450 may be the sum of metrics $M(E_B|C_A, P_j)$ 490 in a predetermined communication scheme $C_A$.

The determination apparatus 110 may extract fourth suitability metrics (e.g., $M(C_A|P_B)$ 470 of FIG. 4) based on the communication characteristics metric matrix 200. The determination apparatus 110 may calculate the second suitability metrics 430 according to Equation 4 based on the fourth suitability metrics 470.

The determination apparatus 110 may extract fifth suitability metrics (e.g., $M(E_A|C_B, P_C)$ 490 of FIG. 4) based on the communication characteristics metric matrix 200. The determination apparatus 110 may calculate the third suitability metrics 450 according to Equation 5 based on the fifth suitability metrics 490.

For example, the determination apparatus 110 may extract the fourth suitability metrics 470 for the communication schemes (e.g., optical network, LTE, Wi-Fi, and LoRa) based on the communication characteristics metric matrix 200. The determination apparatus 110 may calculate the second suitability metrics 430 for the communication schemes according to Equation 4 as follows, based on the fourth suitability metrics 470. A second suitability metric 430 is the sum of fourth suitability metrics 470.

$$M(C_{optical}) = 2/(8*4)+2/(8*4)+2/(8*4)+8/(8*4) = 14/(8*4)$$

$$M(C_{LTE}) = 4/(8*4)+2/(8*4)+2/(8*4)+8/(8*4) = 16/(8*4)$$

$$M(C_{WiFi}) = 6/(8*4)+8/(8*4)+6/(8*4)+4/(8*4) = 24/(8*4)$$

$$M(C_{LoRa}) = 8/(8*4)+8/(8*4)+8/(8*4)+2/(8*4) = 26/(8*4)$$

For example, the determination apparatus 110 may extract fifth suitability metrics 490 for the communication schemes based on the communication adaptability metric matrix 300. The determination apparatus 110 may calculate the third suitability metrics 450 for the communication schemes according to Equation 5 as follows, based on the fifth suitability metrics 490. A third suitability metric 450 is the sum of fifth suitability metrics 490.

In operation 625, the determination apparatus 110 may calculate first suitability metrics 410 for the communication schemes using a conditional probability based on the communication characteristics metric matrix 200 and the communication adaptability metric matrix 300. In calculating the first suitability metrics 410, the following equation may be used.

$$M(C_A|E_B) = \frac{M(E_B|C_A)M(C_A)}{M(E_B)} = \frac{M(E_B|C_A)M(C_A)}{\sum_{j=1}^{N} M(E_B|C_i)} \quad \text{[Equation 6]}$$

In Equation 6, N denotes the number of other communication schemes being considered for the FEMS network configuration of a corresponding factory.

The determination apparatus 110 may calculate the first suitability metrics 410 based on the second suitability metrics 430 and the third suitability metrics 450.

For example, the determination apparatus 110 may calculate the first suitability metrics 410 based on second suitability metrics 430 and third suitability metrics 450 for communication schemes under consideration for Utility 2 170-2.

$$M(C_{Optical}|E_{Utility2}) =$$

$$\frac{M(E_{Utility2}|C_{Optical})M(C_{Optical})}{M(E_{Utility2}|C_{Optical})+M(E_{Utility2}|C_{LTE})+M(E_{Utility2}|C_{WiFi})+M(E_{Utility2}|C_{LoRa})} =$$

$$\frac{(128/(96*4))*(14/(8*4))}{128/(96*4)+152/(96*4)+248/(96*4)+272/(96*4)} = \frac{1792}{800*(8*4)}$$

$$M(C_{LTE}|E_{Utility2}) =$$

$$\frac{M(E_{Utility2}|C_{LTE})M(C_{LTE})}{M(E_{Utility2}|C_{Optical})+M(E_{Utility2}|C_{LTE})+M(E_{Utility2}|C_{WiFi})+M(E_{Utility2}|C_{LoRa})} =$$

$$\frac{(152/(96*4))*(16/(8*4))}{128/(96*4)+152/(96*4)+248/(96*4)+272/(96*4)} = \frac{2432}{800*(8*4)}$$

$$M(C_{WiFi}|E_{Utility2}) =$$

$$\frac{M(E_{Utility2}|C_{WiFi})M(C_{WiFi})}{M(E_{Utility2}|C_{Optical})+M(E_{Utility2}|C_{LTE})+M(E_{Utility2}|C_{WiFi})+M(E_{Utility2}|C_{LoRa})} =$$

$$\frac{(248/(96*4))*(24/(8*4))}{128/(96*4)+152/(96*4)+248/(96*4)+272/(96*4)} = \frac{5952}{800*(8*4)}$$

$$M(C_{LoRa}|E_{Utility2}) =$$

$$\frac{M(E_{Utility2}|C_{LoRa})M(C_{LoRa})}{M(E_{Utility2}|C_{Optical})+M(E_{Utility2}|C_{LTE})+M(E_{Utility2}|C_{WiFi})+M(E_{Utility2}|C_{LoRa})} =$$

$$\frac{(272/(96*4))*(26/(8*4))}{128/(96*4)+152/(96*4)+248/(96*4)+272/(96*4)} = \frac{7072}{800*(8*4)}$$

$$M(E_{Utility2}|C_{optical}) = 24/(96*4)+24/(96*4)+16/(96*4)+64/(96*4) = 128/(96*4)$$

$$M(E_{Utility2}|C_{LTE}) = 48/(96*4)+24/(96*4)+16/(96*4)+64/(96*4) = 152/(96*4)$$

$$M(E_{Utility2}|C_{WiFi}) = 72/(96*4)+96/(96*4)+48/(96*4)+32/(96*4) = 248/(96*4)$$

$$M(E_{Utility2}|C_{LoRa}) = 96/(96*4)+96/(96*4)+64/(96*4)+16/(96*4) = 272/(96*4)$$

In operation 630, the determination apparatus 110 may verify whether the calculation for selected communication schemes is completed. When the calculation is completed, the determination apparatus 110 may determine the suitability of a network configuration, in operation 635. When the calculation is not completed, the determination apparatus 110 may return to operation 620 and calculate a metric for a communication scheme for which the calculation is not completed.

In operation 635, the determination apparatus 110 may select the most suitable communication scheme at a selected energy management level in the FEMS network configuration based on the first suitability metrics 410. The determination apparatus 110 may compare the first suitability metrics 410 for the communication schemes usable for the network configuration. The determination apparatus 110 may select a communication scheme having a largest first metric 410 as the most suitable communication scheme for the network configuration.

For example, the determination apparatus 110 may compare first suitability metrics (e.g., $M(C_{optical}|E_{Utility2})$, $M(C_{LTE}|E_{Utility2})$, $M(C_{WiFi}|E_{Utility2})$, and $M(C_{LoRa}|E_{Utility2})$). According to the result of comparing the first suitability metrics by the determination apparatus 110, $M(C_{LoRa}|E_{Utility2})$ is $$\frac{7072}{800*(8*4)},$$

which is the largest. That is, the determination apparatus 110 may determine that the LoRa communication scheme is more suitable than the other communication schemes, as a result of calculating the first suitability metrics of the communication schemes for the energy management level of Utility 2 170-2.

In operation 640, the determination apparatus 110 may verify whether the determination of the FEMS network configuration suitability is completed for all energy management levels 170. When the suitability determination for all energy management levels 170 is not completed, the determination apparatus 110 may return to operation 605 and determine the suitability again.

Figure 7:
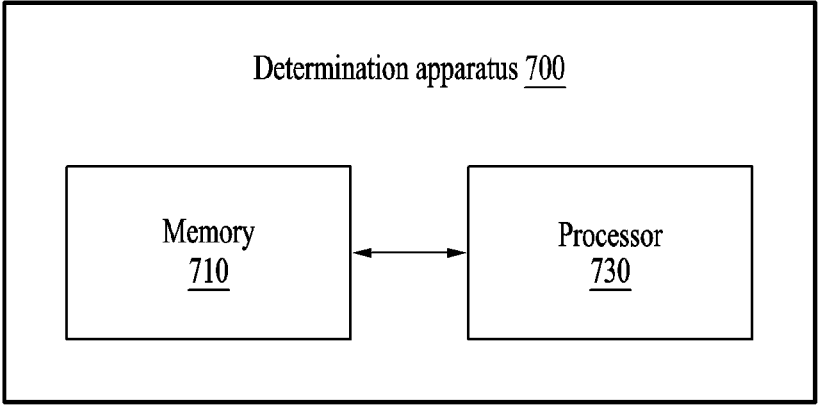
FIG. 7 illustrates an example of a determination apparatus according to an embodiment.

FIG. 7 illustrates an example of a determination apparatus according to an embodiment.

Referring to FIG. 7, a determination apparatus 700 (e.g., an apparatus for determining the suitability of an FEMS network configuration) may include a memory 710 and a processor 730. The determination apparatus 700 may be the determination apparatus 110 of FIG. 1.

The memory 710 may store instructions (or programs) executable by the processor 730. For example, the instructions may include instructions to perform an operation of the processor 730 and/or an operation of each element of the processor 730.

The processor 730 may process data stored in the memory 710. The processor 730 may execute computer-readable code (e.g., software) stored in the memory 710 and instructions triggered by the processor 730.

The processor 730 may be a data processing device implemented by hardware including a circuit having a physical structure to perform desired operations. For example, the desired operations may include code or instructions included in a program.

For example, the hardware-implemented data processing device may include a microprocessor, a central processing unit (CPU), a processor core, a multi-core processor, a multiprocessor, an application-specific integrated circuit (ASIC), and a field-programmable gate array (FPGA).

The determination apparatus 110 of FIG. 1 may be stored in the memory 710 and executed by the processor 730 or embedded in the processor 730. The processor 730 may perform the operation of the determination apparatus 110 described with reference to FIGS. 1 to 6 in substantially the same manner. Accordingly, a further description thereof will be omitted herein.

The components described in the embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the embodiments may be implemented by software, and the software may be recorded on a recording medium. The components, the functions, and the processes described in the embodiments may be implemented by a combination of hardware and software.

The units described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described embodiments, or vice versa.

A number of embodiments have been described above. Nevertheless, it should be understood that various modifications may be made to these embodiments. For example, suitable results may be achieved if the described techniques are performed in a different order and/or if components in a described system, architecture, device, or circuit are combined in a different manner and/or replaced or supplemented by other components or their equivalents.

What is claimed is:

1. A method of reconfiguring a network configuration for a factory energy management system (FEMS), the method comprising:

receiving an energy management level for obtaining a suitability determination result of the network configuration;

receiving second parameters according to the energy management level among first parameters set for the network configuration;

receiving a communication characteristics matrix and a communication adaptability matrix for communication schemes usable for the network configuration;

obtaining a communication characteristics metric matrix by normalizing the communication characteristics matrix, based on the second parameters and the communication characteristics matrix;

obtaining a communication adaptability metric matrix by normalizing the communication adaptability matrix, based on the energy management level, the second parameters, and the communication adaptability matrix;

determining the suitability determination result of the network configuration at the energy management level based on the communication characteristics metric matrix and the communication adaptability metric matrix;

outputting a most suitable communication scheme at the energy management level to the factory energy management system based on the suitability determination result; and controlling the factory energy management system deployed in a factory to reconfigure a network configuration of a factory facility of the factory using the most suitable communication scheme, wherein the communication characteristics matrix comprises characteristic values indicating characteristics of the communication schemes for the first parameters, and the communication adaptability matrix comprises characteristic values indicating characteristics of the communication schemes for the first parameters, considering a weight according to the energy management level.

2. The method of claim 1, wherein the first parameters comprise one or more of a low operating expense (OPEX) characteristic, a low capital expenditure (CAPEX) characteristic, a flexibility, a high data rate characteristic, a high reliability characteristic, a low latency characteristic, a low power characteristic, and a low cost characteristic of the network.

3. The method of claim 1, wherein the obtaining of the communication characteristics metric matrix comprises:

extracting characteristic values for the second parameters from the communication characteristics matrix; and normalizing the characteristic values for the second parameters to a value obtained by multiplying a number of second parameters by a maximum value for constituting the communication characteristics matrix.

4. The method of claim 1, wherein the obtaining of the communication adaptability metric matrix comprises:

extracting characteristic values for the second parameters according to the energy management level from the communication adaptability matrix; and normalizing the characteristic values for the second parameters according to the energy management level to a value obtained by multiplying a number of second parameters by a maximum value for constituting the communication adaptability matrix.

5. The method of claim 1, wherein the determining of the suitability determination result of the network configuration comprises:

calculating first suitability metrics for the communication schemes using a conditional probability based on the communication characteristics metric matrix and the communication adaptability metric matrix; and selecting a most suitable communication scheme at the energy management level in the network configuration based on the first suitability metrics, wherein the first suitability metrics indicate how suitable a predetermined communication scheme for the energy management level is for the network configuration as numerical indices.

6. The method of claim 5, wherein the calculating of the first suitability metrics comprises:

calculating second suitability metrics for the communication schemes based on the communication characteristics metric matrix; and calculating third suitability metrics for the communication schemes based on the communication adaptability metric matrix, wherein the second suitability metrics indicate how suitable a predetermined communication scheme is for the network configuration as numerical indices, and the third suitability metrics indicate how suitable the energy management level for a predetermined communication scheme is for the network configuration as numerical indices.

7. The method of claim 6, wherein the calculating of the first suitability metrics further comprises calculating the first suitability metrics based on the second suitability metrics and the third suitability metrics.

8. The method of claim 6, wherein the calculating of the second suitability metrics comprises:

extracting fourth suitability metrics based on the communication characteristics metric matrix; and calculating the second suitability metrics based on the fourth suitability metrics, wherein the fourth suitability metrics indicate how suitable a communication scheme for the second parameters is for the network configuration as numerical indices.

9. The method of claim 6, wherein the calculating of the third suitability metrics comprises:

extracting fifth suitability metrics based on the communication adaptability metric matrix; and calculating the third suitability metrics based on the fifth suitability metrics, wherein the fifth suitability metrics indicate how suitable the energy management level for a predetermined communication scheme and the second parameters is for the network configuration as numerical indices.

10. The method of claim 5, wherein the selecting of the communication scheme comprises:

comparing the first suitability metrics for the communication schemes usable for the network configuration; and selecting a communication scheme having a largest first metric as the most suitable communication scheme for the network configuration.

11. An apparatus for reconfiguring a network configuration for a factory energy management system (FEMS), the apparatus comprising:

a memory configured to store one or more instructions; and a processor configured to execute the instructions;

wherein when the instructions are executed, the processor is configured to perform a plurality of operations, wherein the plurality of operations comprise:

receiving an energy management level for obtaining a suitability determination result of the network configuration;

receiving second parameters according to the energy management level among first parameters set for the network configuration;

receiving a communication characteristics matrix and a communication adaptability matrix for communication schemes usable for the network configuration;

obtaining a communication characteristics metric matrix by normalizing the communication characteristics matrix, based on the second parameters and the communication characteristics matrix;

obtaining a communication adaptability metric matrix by normalizing the communication adaptability matrix, based on the energy management level, the second parameters, and the communication adaptability matrix;

determining the suitability determination result of the network configuration at the energy management level based on the communication characteristics metric matrix and the communication adaptability metric matrix;

outputting a most suitable communication scheme at the energy management level to the factory energy management system based on the suitability determination result; and controlling the factory energy management system deployed in a factory to reconfigure a network configuration of a factory facility of the factory using the most suitable communication scheme, wherein the communication characteristics matrix comprises characteristic values indicating characteristics of the communication schemes for the first parameters, and the communication adaptability matrix comprises characteristic values indicating characteristics of the communication schemes for the first parameters, considering a weight according to the energy management level.

12. The apparatus of claim 11, wherein the first parameters comprise one or more of a low operating expense (OPEX) characteristic, a low capital expenditure (CAPEX) characteristic, a flexibility, a high data rate characteristic, a high reliability characteristic, a low latency characteristic, a low power characteristic, and a low cost characteristic of the network.

13. The apparatus of claim 11, wherein the obtaining of the communication characteristics metric matrix comprises:

extracting characteristic values for the second parameters from the communication characteristics matrix; and normalizing the characteristic values for the second parameters to a value obtained by multiplying a number of second parameters by a maximum value for constituting the communication characteristics matrix.

14. The apparatus of claim 11, wherein the obtaining of the communication adaptability metric matrix comprises:

extracting characteristic values for the energy management level and the second parameters from the communication adaptability matrix; and normalizing the extracted characteristic values to a value obtained by multiplying a number of second parameters by a maximum value for constituting the communication adaptability matrix.

15. The apparatus of claim 11, wherein the determining of the suitability determination result of the network configuration comprises:

calculating first suitability metrics for the communication schemes using a conditional probability based on the communication characteristics metric matrix and the communication adaptability metric matrix; and selecting a most suitable communication scheme at the energy management level in the network configuration based on the first suitability metrics, wherein the first suitability metrics indicate how suitable a predetermined communication scheme for the energy management level is for the network configuration as numerical indices.

16. The apparatus of claim 15, wherein the calculating of the first suitability metrics comprises:

calculating second suitability metrics for the communication schemes based on the communication characteristics metric matrix; and calculating third suitability metrics for the communication schemes based on the communication adaptability metric matrix, wherein the second suitability metrics indicate how suitable a predetermined communication scheme is for the network configuration as numerical indices, and the third suitability metrics indicate how suitable the energy management level for a predetermined communication scheme is for the network configuration as numerical indices.

17. The apparatus of claim 16, wherein the calculating of the first suitability metrics further comprises calculating the first suitability metrics based on the second suitability metrics and the third suitability metrics.

18. The apparatus of claim 16, wherein the calculating of the second suitability metrics comprises:

extracting fourth suitability metrics based on the communication characteristics metric matrix; and calculating the second suitability metrics based on the fourth suitability metrics, wherein the fourth suitability metrics indicate how suitable a communication scheme for the second parameters is for the network configuration as numerical indices.

19. The apparatus of claim 16, wherein the calculating of the third suitability metrics comprises:

extracting fifth suitability metrics based on the communication adaptability metric matrix; and calculating the third suitability metrics based on the fifth suitability metrics, wherein the fifth suitability metrics indicate how suitable the energy management level for a predetermined communication scheme and the second parameters is for the network configuration as numerical indices.

20. The apparatus of claim 15, wherein the selecting of the communication scheme comprises:

comparing the first suitability metrics for the communication schemes usable for the network configuration; and selecting a communication scheme having a largest first metric as the most suitable communication scheme for the network configuration.

\*  \*  \*  \*  \*